Feb. 5, 1952 G. F. WALES ET AL 2,584,403
DRIVING MECHANISM AND SUPPORTING
STRUCTURE FOR MACHINES
Filed June 30, 1949 2 SHEETS—SHEET 1
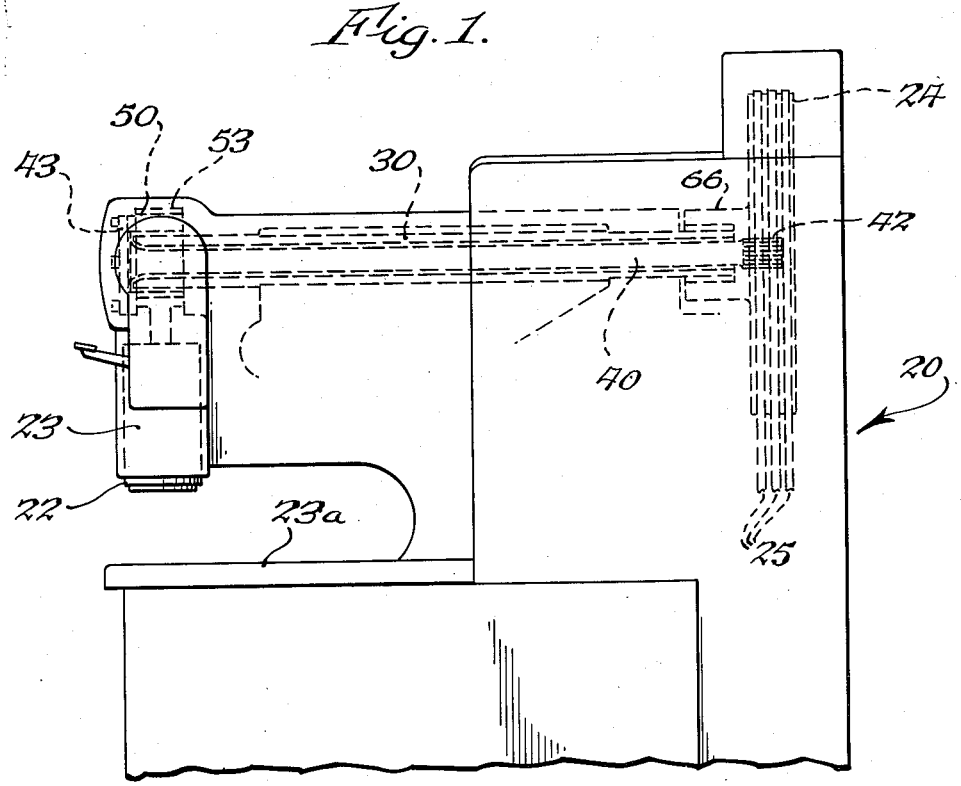
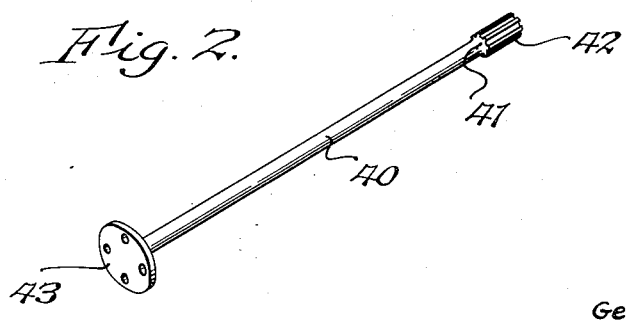
INVENTORS
George F. Wales
Paul H. Taylor
By Edwin B. Gary
Attorney.

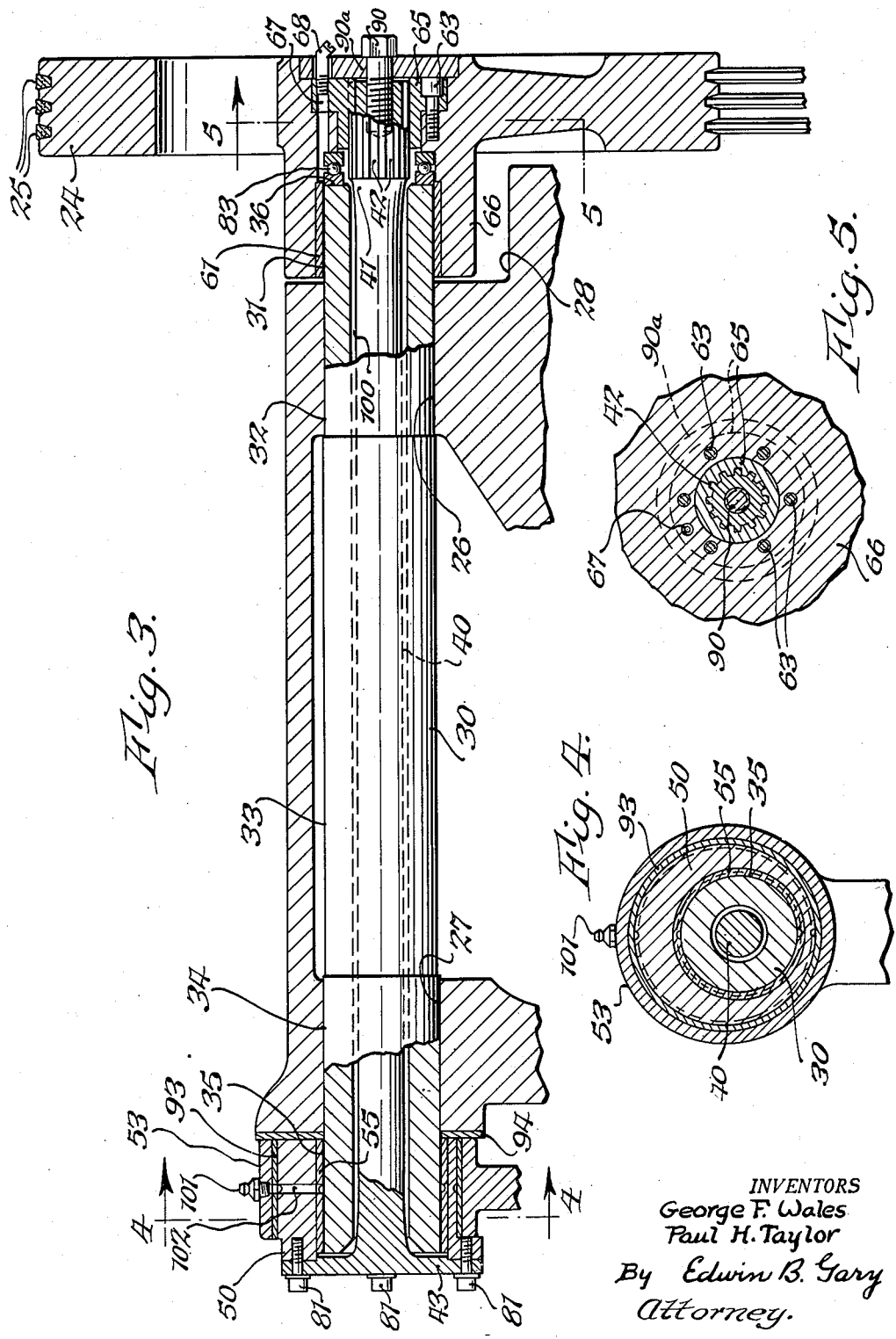

Patented Feb. 5, 1952

2,584,403

UNITED STATES PATENT OFFICE 2,584,403

DRIVING MECHANISM AND SUPPORTING STRUCTURE FOR MACHINES

George F. Wales, Kenmore, and Paul H. Taylor, North Tonawanda, N. Y.; said Taylor assignor to said Wales Application June 30, 1949, Serial No. 102,384

11 Claims. (Cl. 74—44)

This invention relates to improvements in machine drives of the kind wherein the movement of a rotating power shaft is utilized to produce the desired movement of the work-performing instrumentality; and more particularly the invention is concerned with a novel form of such a drive and to a novel method of assembling the parts thereof.

In existing machine tools such as presses and the like, the power shaft is designed so that in transmitting power to the work-performing tool, its rotary movement will be converted into the type of movement required to operate the tool. The resistance offered by the work to the operation of the tool is transmitted to the power shaft which in turn transmits this load to the machine. The shaft, therefore, is subjected both to bending loads resulting from the resistance offered by the work and to torsional loads transmitted through the shaft to overcome such resistance. Between its bearings, the power shaft is unsupported. Consequently the shaft may be deflected for its full length in response to the forces resulting from the resistance offered by the work. Unequal loading is, therefore, applied to the supporting surfaces of the shaft bearings and in the case of flywheel driven machines the flywheel will also be subjected to deflection. Since it is not uncommon for the length of the power shaft to be twice the diameter of the flywheel, or thereabouts, the deflection occurring at the center of the power shaft would, in such cases be equal to twice the amplitude of the flywheel deflection. Sudden loads which tend to disturb the flywheel mass introduce other stresses in the power shaft. This necessitates increasing the diameter of the shaft to resist deflection. Since the bearings used to support the shaft must be a comparatively tight fit, i. e. on a four-inch shaft about .005 inch clearance, the deflection of the shaft in the center causes the bearings at the terminal portions to wear egg-shaped on diagonal corners, thereby aggravating the causes of deflection and necessitating early and frequent repair of the machine. As the power shaft supports the driving mechanism and the flywheel, replacement of the shaft entails the removal of the driving mechanism and the flywheel. The flywheel on a small machine weighs upwards of two hundred and fifty pounds. Hence its removal for repair or replacement requires special tools, such as cranes, etc. and entails hazard on the part of the workmen who take apart and reassemble the machine. In machine tool construction, the specialization in design for particular requirements such as stroke or force necessitates that each shaft and supporting structure be individually machined, a costly special operation and of considerable expense to the user in the replacement of the shafts. This is especially true, since most machines of this type embody an eccentric machined directly on the shaft. The forming of the eccentric on the shaft creates a point of weakness at the point where the eccentric joins the shaft. In order to minimize this weakness, the shaft is now designed of a sufficient size to provide an eccentric which will more than carry the loads of the machine. Obviously this entails heavy massive shafting with resultant costly machining. In order to minimize the weakness where the section changes from the eccentric to the shaft, it is customary to forge the shaft to provide continuous grain structure through the point of weakness. This also is a costly and expensive operation. If, on the other hand, a machined shaft is used in which the eccentric is large and the shaft is machined to provide the desired eccentricity, the great length of the shaft and resultant machining renders the cost of such construction as high as the foregoing arrangement. The above difficulties encountered in standard machine tool construction and the methods described which have been employed to overcome them have represented a substantial item in the cost of such machines and have been responsible to a large degree to their high cost.

The principal object of the present invention, therefore, is to overcome the above objections, this object contemplating the support of the power shaft in such a manner that it will not be subjected to the forces of deflection which are produced as a result of the resistance offered by the work to the operation of the tool.

A related object is to provide a driving mechanism in which the power shaft is subjected only to torsional loads involved in operating the tool.

A still further object is to provide a drive for a machine tool which is so designed that the power shaft may be replaced without the necessity of removing associated parts of the machine.

Still another object is to provide a drive for a machine tool which utilizes standard parts.

A related object is to provide a drive which is so designed that the stroke of the work-performing tool may be varied with facility.

Another related object is to provide a machine tool in which the variable components which require special machining are of such a nature as to represent only a small item of the cost of manufacture.

Another object is to provide for the support of the power shaft in such a manner that the bearing loads are evenly distributed over the area of the bearing surfaces which support the revolving members, whereby the life of the bearing members may be increased substantially.

Yet another object is to provide a novel means for lubricating the elements of the drive and for maintaining a reserve supply of lubricant which will be adequate to meet all requirements for bearing lubrication during operation of the machine with which the drive is associated.

The invention is illustrated in the accompanying drawings, wherein;

Fig. 1 is a side elevation of an end-wheel, gap-type press-working machine tool having a drive (shown in dotted lines) embodying the features of the invention;

Fig. 2 is a perspective view of the power shaft of the drive;

Fig. 3 is an enlarged sectional view illustrating the components of the drive in an operative assembly;

Fig. 4 is a transverse section taken along line 4—4 of Fig. 3; and

Fig. 5 is a similar sectional view taken along line 5—5 of Fig. 3.

The drive is illustrated generally in Figure 1 in connection with an end-wheel, gap-type press-working machine tool. The latter is indicated at 20 and the tool operating element thereof at 22, the said element being carried by the head 23 and overhanging the bed 23a of the machine. A flywheel 24 is connected by a plurality of belts 25 to the drive pulley of the motor (not shown) of the machine and is splined to one end of a power shaft 40 which turns within a tubular member 30. At its opopsite end, a flange 43 on the power shaft is connected to an eccentric 50 journalled on the outer end of the member 30. The eccentric 50 reciprocates a pitman 53 which is connected to the tool operating element 22.

A detail construction of the drive is illustrated in Figure 3. In this view it will be noted that aligned bores 26 and 27 are formed through spaced-apart, land portions of the frame, the latter also being notched at 28, for reasons which will appear hereafter, in the land section in which the bore 26 is formed.

The tubular member 30 is formed with a series of stepped sections 31, 32, 33, 34 and 35 of varying diameters, increasing progressively from the section 31 of smallest diameter to section 34 and then decreasing in diameter in section 35. Sections 31 and 32 are very similar in diameter, the former being slightly smaller in diameter than the latter as a result of the grinding and polishing operations performed to provide a bearing surface. Section 32, is therefore, slightly larger than section 31 and has a machined surface for a shrink or press fit. Section 33 is but slightly larger in diameter than section 32, say .0015 to .0020 inch; and section 34 is larger than section 33 by the same increment. Section 35 is slightly smaller in diameter than section 34 as a result of grinding or polishing operations to provide a bearing surface, section 34, therefore, being slightly larger in diameter than section 35 and having a machined surface for a shrink or press fit.

It will be apparent from the foregoing that in order to obtain a shrink fit of the tube 30 in the bores 26 and 27 of the frame 21, it is only necessary to reduce the tubular member 30 to, and maintain it at, the desired low temperature by a suitable coolant (which may be introduced into the said member) and while so reduced in temperature insert it into the bores 26 and 27 until the sections 32 and 34 start to enter the bores 26 and 27, respectively. The tubular member 30 may then be removed from the tube, whereupon the expanding sections 32 and 34 seize in the bores 26 and 27 and the tube thus, in effect, becomes an integral part of the frame 21. If desired, the tube may be installed by a press fit operation instead of by the shrink fit operation described.

The use of a tubular member 30 of the type described has a number of advantages. First, assembling operations are facilitated as the sections 33 and 34 enter the respective bores 26 and 27, simultaneously. So far as the tubular member itself is concerned, conventional cold drawn seamless tubing may be availed of and may be procured with the necessary varying diameter sections preformed therein. A further advantage obtained is that if the tubular member becomes damaged, it may be removed by applying pressure at the end of section 31.

The frame assembly which has been produced in the manner described includes the tubular member 30 having the terminal extensions 31 and 35 projecting therefrom. It would, of course, be possible to form the sections 31 and 35 as integral parts of the press frame, and this is contemplated by the invention, although it would involve difficult and costly operations. Moreover, there is the advantage that seamless tubing possesses more suitable properties than the casting which usually comprises the frame 21.

The extension 35 serves as a bearing support for the tool driving mechanism which includes the eccentric 50 journalled thereon and the pitman 53 which is journalled on the eccentric. At the other end of the tubular member, the extension 31 which is located in the notch 28 provides a support for the flywheel 24 which is journalled thereon, the flywheel having a hub flange 66 which contains a bearing 61 pressed therein. The latter rides on the section 31 of the tubular member 30. At the tool driving end of the power shaft, the eccentric 50 has a bearing 55 pressed therein which rides on the bearing section 35 of the tubular member 30. Pitman 53 has a bearing 93 pressed therein which rides on the eccentric 50. It will thus be apparent that flywheel 24, eccentric 50, pitman 53 and ram 22 can be completely assembled and supported by the machine and that when this is done the driving and driven elements may be connected by assembling the power shaft 40.

The flywheel 24 is coupled to the shaft 40 by a hardened splined member 65 which is best shown in Figure 5 and a splined section 42 formed on an enlargement 41 of the shaft 40. The flywheel 24 is connected to the hardened splined member 65 by bolts 63. The torsional force transmitted to the power shaft 40 is transmitted by the latter to the eccentric 50 through the flange 43 which is connected to the eccentric by bolts 81. It will be apparent from the foregoing that any press-working or other tool-working loads applied to pitman 53, as it is driven by eccentric 50, will be transmitted directly to section 35 of tubular member 30 and carried by the shoulder section 34 to the portion of the frame in which the bore 27 is formed. It will likewise be apparent that the power shaft 40 carries none of these loads but merely transmits only the driving torque from flywheel 24. This can be easily observed in Figure 4 which shows the tight bearing surface between the tool-working components and the tubular member 30 and the large clearance apparent between the power shaft 40 and the said member. The weight of flywheel 24 and any extraneous forces which may be developed incident to its operation are transmitted directly to the tubular member 30 through the co-operating surfaces 31 and bearing 61. It will be noted that by the construction described removal of a shaft 40, which has failed in service, may be readily effected, requiring only the removal of the bolt 90, which acts against a cap 90a, and the bolts 81. When the bolts 81 and 90 have been removed, the shaft 40 may be withdrawn without disturbing any of the associated components of the machine.

To obtain the necessary adjustments accurately with respect to the driving element 24 and the driven elements 50 and 53, and thereby provide a free-running machine, it is only necessary to adjust the bolt 90, which is a tight-fitting self-locking bolt, until the proper end clearance is obtained between the thrust bearing 94 at the front of the machine and the pitman 53. At the flywheel end of the machine, a ball thrust bearing 83 is provided which engages the adjacent end 36 of the tubular member 30 to prevent the flywheel 24 from riding forward in operation.

Lubricant is supplied to the bearing surfaces through a fitting 68 which is carried by the member 65 and a bore 67 formed therein and the excess fills a clearance chamber 100 between the power shaft 40 and the tubular member 30. The driven mechanism is lubricated through a fitting 101 which supplies the lubricant to the bearing 93 and through a duct 102 in the eccentric 50 to the bearing 55. Surplus lubricant enters the chamber 100 where it is maintained in reserve for any loss of lubricant in either the driving or driven elements. When any of the bearings become dry, the heat generated thereby will tend to cause the lubricant to flow from the reserve chamber 100 to the dry bearing.

It will be apparent that the drive described has many advantages with respect to strength and economy. For example, the power shaft 40 may be a standard shafting component obtained in any desired length, constituting a forged member possessing strength far in excess of that required for most machine tool applications. The shaft has no special characteristics and requires none. The eccentric 50 is a simple eccentric, being machined out of a standard tubular section. The eccentricity, or driving stroke of the machine, may, therefore, be easily modified by replacing the eccentric, with no changes being required in the design or characteristics of the power shaft 40.

The drive described has the further advantage that maintenance costs are reduced to a minimum by by-passing the power shaft in transmitting to the frame of the machine all forces resulting from the resistance offered to the operation of the work-performing tool by the work. As noted, all such forces are transmitted to the eccentric 50 and are carried into the frame of the machine without exerting any force on the power shaft other than an increase in the torsion load. Consequently all loads are distributed uniformly to the bearing surfaces, thereby insuring long use and avoiding frequent replacement of the bearings.

The illustration of the drive in connection with a press-working machine tool is intended by way of example only, as the advantages of the invention may be obtained by the use of the drive in connection with various kinds of machines. The invention also contemplates such modifications of the drive per se as may come within the scope of the appended claims.

We claim as our invention:

1. A drive for a machine tool having a reciprocating work-performing instrumentality and a frame by which said instrumentality is carried, said drive including a tubular member which is carried by said frame, an eccentric journalled on said tubular member, means journalled on said eccentric and to which said instrumentality is connected, and a power shaft located in said tubular member and to which said eccentric is connected.

2. A drive for a machine tool having a reciprocating work-performing instrumentality and a frame by which said instrumentality is carried, said drive including a tubular member which is carried by said frame, an eccentric journalled on said tubular member, means journalled on said eccentric and to which said instrumentality is connected and a power shaft located in said tubular member, said shaft having a flanged end located beyond an end of said tubular member and to which said eccentric is connected.

3. A drive for a machine tool having a reciprocating work-performing instrumentality and a frame by which said instrumentality is carried, said drive including a tubular member which is carried by said frame, an eccentric journalled on said tubular member, means journalled on said eccentric and to which said instrumentality is connected, a power shaft located in said tubular member, and means for detachably connecting said eccentric and shaft.

4. A drive for a machine tool having a reciprocating work-performing instrumentality and a frame by which said instrumentality is carried, said drive including a tubular member which is carried by said frame, an eccentric journalled on said tubular member, means journalled on said eccentric and to which said instrumentality is connected, a power shaft located coaxially of said tubular member and in spaced relation with respect to the walls thereof, and means for connecting said eccentric to said shaft.

5. A drive for a machine tool having a reciprocating work-performing instrumentality and a frame by which said instrumentality is carried, said drive including a tubular member which is carried by said frame, an eccentric journalled on said tubular member, means journalled on said eccentric and to which said instrumentality is connected, a power shaft located coaxially of said tubular member and in spaced relation with respect to the walls thereof, said shaft having a flanged end, and means for detachably connecting said eccentric to the flanged end of said shaft.

6. A drive for a machine having a work-performing instrumentality and a frame by which said instrumentality is carried, said drive including a tubular member which is carried by said frame, a driven element journalled on said tubular member and to which said instrumentality is connected, a driving element journalled on said tubular member, and a power shaft extending through said tubular member and connecting said driving and driven elements.

7. A drive for a machine having a work-performing instrumentality and a frame by which said instrumentality is carried, said drive including a tubular member which is carried by said frame, a driven element journalled on said tubular member and to which said instrumentality is connected, a driving element journalled on said tubular member, and a power shaft extending through said tubular member in spaced relation with respect to the walls thereof and connecting said driving and driven elements.

8. A drive for a machine having a work-performing instrumentality and a frame by which said instrumentality is carried, said drive including a tubular member which is carried by said frame, a driven element journalled on said tubular member and to which said instrumentality is connected, a driving flywheel journalled on said tubular member, and a power shaft extending through said tubular member and connecting said flywheel and driven element.

9. A drive for a machine having a work-performing instrumentality and a frame by which said instrumentality is carried, said drive including a tubular member which is carried by said frame, a driven element journalled on said tubular member and to which said instrumentality is connected, a driving flywheel journalled on said tubular member, a power shaft extending coaxially of said tubular member in spaced relation with respect to the walls thereof, and means for detachably connecting said driven element and flywheel to said shaft.

10. A drive for a machine having a work-performing instrumentality and a frame by which said instrumentality is carried, said frame being formed with aligned, spaced-apart bores of different diameters, said drive including a tubular member having stepped sections of different diameters, one of said sections fitting tightly in one of said bores and another of said sections fitting tightly in another, a driven element journalled on said tubular member and to which said instrumentality is connected, a driving element journalled on said tubular member, and a power shaft extending through said tubular member and connecting said driving and driven elements.

11. A drive for a machine having a work-performing instrumentality and a frame by which said instrumentality is carried, said drive including a tubular member which is carried by said frame, a plurality of driven elements journalled on said tubular member and through which said instrumentality is driven, a driving element journalled on said tubular member, a power shaft extending through said tubular member in spaced relation with respect to the walls thereof and connecting said driving and driven elements, and means for introducing a lubricating medium into the space between the relatively movable surfaces.

GEORGE F. WALES.
PAUL H. TAYLOR.

REFERENCES CITED

The following references are of record in the file of this patent:

UNITED STATES PATENTS

| Number | Name | Date |
| --- | --- | --- |
| 863,604 | Herzog | Aug. 20, 1907 |
| 1,826,152 | Philippi | Oct. 6, 1931 |
| 2,238,711 | Soldan | Apr. 15, 1941 |